USO05579151A

United States Patent [19]
Cho

[11] Patent Number: 5,579,151
[45] Date of Patent: Nov. 26, 1996

[54] SPATIAL LIGHT MODULATOR

[75] Inventor: Chih-Chen Cho, Richardson, Tex.

[73] Assignee: Texas Instruments Incorporated, Dallas, Tex.

[21] Appl. No.: 390,189

[22] Filed: Feb. 17, 1995

[51] Int. Cl.$^6$ ................................................. G02B 26/00
[52] U.S. Cl. ......................................... 359/291; 359/846
[58] Field of Search ................................. 359/298, 316, 359/318, 846, 847, 224, 290, 291

[56]  References Cited

U.S. PATENT DOCUMENTS

| 3,600,798 | 8/1971 | Lee | 29/592 |
| 3,886,310 | 5/1975 | Guldberg et al. | 178/7.5 |
| 3,896,338 | 7/1975 | Nathanson et al. | 315/373 |
| 4,229,732 | 10/1980 | Hartstein et al. | 340/378 |
| 4,356,730 | 11/1982 | Cade | 73/517 |
| 4,728,185 | 3/1988 | Thomas | 353/122 |
| 5,041,851 | 8/1991 | Nelson | 346/160 |
| 5,061,049 | 10/1991 | Hornbeck | 359/224 |
| 5,079,544 | 1/1992 | DeMond et al. | 340/701 |
| 5,096,279 | 3/1992 | Hornbeck et al. | 359/230 |
| 5,101,236 | 3/1992 | Nelson et al. | 355/229 |
| 5,293,511 | 3/1994 | Poradish et al. | 257/434 |
| 5,331,454 | 7/1994 | Hornbeck | 359/224 |
| 5,432,645 | 7/1995 | Terunuma et al. | 360/126 |

OTHER PUBLICATIONS

Ser. No. 8/239,497, Wallace, et al., filed May 9, 1994.
Levine and Zisman, "Physical Properties of Monolayers Adsorbed at the Solid–Air Interface. I. Friction and Wettability of Aliphatic Polar Compounds and Effect of Halogenation." J. Phys Chem. 61, (1957) vol. 61, pp. 1068–1077.
Levine and Zisman, "Physical Properties of Monolayers Adsorbed at the Solid–Air Interface. II. Mechanical Durability of Aliphatic Polar Compounds and Effect of Halogenation", J. Phys Chem. 61, (1957) vol. 61, pp. 1188–1196.
Alley, et al., "The Effect of Release–Etch Processing on Surface Microstructure Stiction" IEEE Solid State Sensor and Actuator Workshop (1992) pp. 202–207.

Primary Examiner—Nabil Z. Hindi
Assistant Examiner—Dawn-Marie Bey
Attorney, Agent, or Firm—Robert C. Klinger; James C. Kesterson; Richard L. Donaldson

[57]  ABSTRACT

A spatial light modulator includes a reflector which is electrostatically deflectable out of a normal position, whereat a supporting beam is unstressed, into a deflected position, whereat a portion of the mirror contacts a portion of a landing electrode at the same electrical potential as the reflector. An inorganic layer or solid lubricant is deposited on the contacting portions. After the modulator is operated for a period of time, the tendency of the reflector to stick or adhere to the landing electrode is diminished or eliminated by the layer so that the reflector is returned to its normal position without any reset signal or with a reset signal having a reasonably low value. Preferred materials for the layer are SiC, AlN or $SiO_2$.

16 Claims, 5 Drawing Sheets

SPATIAL LIGHT MODULATOR

BACKGROUND OF THE INVENTION

The present invention relates to an improved spatial light modulator ("SLM"), and, more particularly, to an SLM of the digital micromirror device ("DMD") variety having improved operating characteristics.

SLM's are transducers that modulate incident light in a spatial pattern pursuant to an electrical or other input. The incident light may be modulated in phase, intensity, polarization or direction. SLM's of the deformable mirror class include micromechanical arrays of electronically addressable mirror elements or pixels which are selectively movable or deformable. Each mirror element is movable in response to an electrical input to an integrated addressing circuit formed monolithically with the addressable mirror elements in a common substrate. Incident light is modulated in direction and/or phase by reflection from each element.

As set forth in greater detail in commonly assigned U.S. Pat. No. 5,061,049, deformable mirror SLM's are often referred to as DMD's (for "Deformable Mirror Device" or "Digital Micromirror Device"). There are three general categories of deformable mirror SLM's: elastomeric, membrane and beam. The latter category includes torsion beam DMD's, cantilever beam DMD's and flexure beam DMD's.

Each movable mirror element of all three beam types of DMD's includes a relatively thick metal reflector supported in a normal, undeflected position by an integral relatively thin metal beam. In the normal position, the reflector is spaced from a substrate-supported, underlying control electrode which may have a voltage selectively impressed thereon by the addressing circuit.

When the control electrode carries an appropriate voltage, the reflector is electrostatically attracted thereto and moves or is deflected out of the normal position toward the control electrode and the substrate. Such movement or deflection of the reflector causes deformation of its supporting beam thereby storing therein potential energy which tends to return the reflector to its normal position when the control electrode is de-energized. As a practical matter may be, and often is, insufficient to return the reflector to the normal position. This necessitates the application of one of a variety of reset signals or voltages between the control electrode and the reflector to achieve this end.

The deformation of a cantilever beam comprises bending about an axis normal to the beam's axis; that of a torsion beam comprises deformation by twisting about an axis parallel to the beam's axis; that of a flexure beam, which is a relatively long cantilever beam connected to the reflector by a relatively short torsion beam, comprises both types of deformation, permitting the reflector to move in piston-like fashion. Thus, the movement or deflection of the reflector of a cantilever or torsion beam DMD is rotational, with some parts of the reflector rotating toward the substrate and other parts rotating away from the substrate if the axis of rotation is other than at an edge or terminus of the reflector. The movement or deflection of the reflector of a flexure beam DMD maintains all points on the reflector generally parallel with the substrate.

When the reflector of a beam DMD is operated in binary fashion by its addressing circuit, it occupies one of two positions, the first being the normal position which is set by the undeformed beam, the second position being a deflected position. In one of the positions, the reflector reflects incident light to a selected site, such as a viewing screen, the drum of a xerographic printer or other photoreceptor. In the other position, incident light is not reflected to the photoreceptor.

A typical DMD includes an array of numerous pixels, the reflectors of each of which are selectively positioned to reflect or not reflect light to a desired site.

Because a potential difference must exist between the reflector and the control electrode to deflect the reflector, it is undesirable for these two elements to engage. Engagement of a deflected reflector and its control electrode effects current flow therethrough which may weld them together and/or cause the thinner beam to melt or fuse. In either event the functionality of the involved pixel is destroyed. In response to the foregoing problem, a landing electrode may be associated with each reflector. Typically, in the case of a cantilever- or torsion-beam DMD, the landing electrode resides on the substrate at a greater distance from the rotational axis than the control electrode, both distances being taken parallel to the reflector in its normal position. In a flexure-beam DMD, the top of the landing electrode is elevated above the top of the control electrode. In view of the foregoing, the deflected reflector ultimately engages the landing electrode, but not the control electrode. To prevent damage to reflector, the landing electrode is maintained at the same potential as the reflector. Again, see commonly assigned U.S. Pat. No. 5,061,049.

Notwithstanding the use of a landing electrode, it has been found that a deflected reflector will sometimes stick or adhere to its landing electrode. Such sticking or adherence prevents the energy stored in the deformed beam, or reasonable forces applied to the reflector in other ways, from returning or "resetting" the reflector to its normal position after the control electrode is deenergized. It has been postulated that such sticking is caused, inter alia, by (a) welding (b) intermolecular attraction between the reflector and the landing electrode or (c) high surface energy substances or other particulate, liquid or gaseous contaminants sorbed or deposited on the surface of the landing electrode and/or on the portion of the reflector which contacts the landing electrode. Substances which impart high surface energy to the reflector-landing electrode interface include water vapor and other ambient gases (e.g., carbon monoxide, carbon dioxide, oxygen, hydrogen, nitrogen) and gases and organic components resulting from or left behind following production of the DMD, including gases produced by outgassing from UV-cured adhesives which mount a protective cover to the DMD. Such a protective cover and other DMD "packages" are disclosed in commonly assigned U.S. patent application Ser. No. 033,687, filed Mar. 16, 1993.

Sticking of the reflector to the landing electrode has been overcome by applying selected numbers, durations, shapes and magnitudes of voltage pulses (the previously noted "reset signals") to the control electrode. One type of reset signal attempts to further attract toward the landing electrode a reflector which already engages the landing electrode. This further attraction stores additional potential energy in the already deformed beam. When the control electrode is de-energized, the potential energy stored in the beam is now able to unstick the reflector from the landing electrode and return the reflector to its normal position. A variant reset signal comprises a train of pulses applied to the control electrode to induce a resonant mechanical wave in a reflector already engaging a landing electrode. De-energizing the control electrode as a portion of the reflector is deformed away from the landing electrode unsticks the reflector. For more details concerning the foregoing and other unsticking techniques, see commonly assigned U.S. Pat. No. 5,096,279.

Sticking or adherence of the reflector and the landing electrode may be reduced by appropriate liquid lubricants. Moreover, in commonly assigned U.S. Pat. No. 5,331,454, there are disclosed techniques for passivating the portion of the landing electrode engaged by the deformed reflector and/or the portion of the deformed reflector which engages the landing electrode so that sticking or adherence therebetween is reduced or eliminated. Passivation may be effected by lowering the surface energy of the landing electrode and/or the reflector—or otherwise preventing sticking or adhering. Passivation may be, in turn, effected by chemically vapor-depositing on the engageable surfaces of interest a monolayer of a long-chain aliphatic halogenated polar compound, such as a perfluochemical, examples of which are perfluoroalkyl acid, perfluorodecanoic acid (PFDA), perfluoropolyether (PFPE) and polytetrafluoroethylene (Teflon).

The polar compound perfluoroalkyl acid comprises a chain having an $F_3C$ molecule at a first end, a COOH molecule at the second end and intermediate $CF_2$ molecules. The COOH end becomes firmly attached to surfaces of the DMD—following pretreatment, if necessary, to achieve same—to present very low surface energy $F_3C$ and $CF_2$ molecules for engagement. The other materials function similarly.

The application of the foregoing a compounds to at least that portion of the landing electrode which is engaged by a deformed reflector has resulted in an amelioration of the sticking or adhesion problem.

Objects do not easily, if at all, stick or adhere to low surface energy surfaces. Further, sticking or adherence of substances to low energy surfaces should not occur or be minimized since such surfaces should be resistant to sorption thereonto of the above-discussed high-surface-energy-imparting substances, such as water vapor. Indeed, DMD's on which an anti-stick monolayer, lubricant or other appropriate substance has been deposited may initially exhibit little if any reflector-electrode adherence. This is evidenced by the low magnitudes of reset signals and/or by the proper functioning over time of all or a maximal number of reflectors.

After the DMDs are operated for some time, however, two effects have been noted. First higher magnitudes of reset signals may be required to return the reflectors to their normal positions. Second, at a given reset voltage less than all or a maximal number of the reflectors may return to their normal positions. The same two effects have been noted when protective, lighttransparent covers are mounted to DMD's with adhesives, such as UV-cured epoxies. The above effects have also been noted as worsening after extended operation of DMDs. The foregoing suggests that substances deposited or outgassed from the ambient, from adhesives or from the DMD itself are somehow adhering to, becoming incorporated into or otherwise adversely affecting the low surface energy anti-stick deposit or lubricant, possibly due to defects or discontinuities in the long chains, monolayers or other structure thereof.

Elimination of the sticking phenomenon is an object of the present invention.

SUMMARY OF THE INVENTION

The above and other objects are achieved by fabricating an improved DMD. Generally, the DMD includes a movable mirror element having a normal position set by a deformable beam in its undeformed state. The mirror also has a deflected position in which the beam is deformed and a portion of the mirror element engages a portion of a stationary member, or landing electrode, which is typically at the same electric potential as the reflector.

Deformation of the beam stores energy therein which tends to return the mirror element to the normal position. The mirror element is selectively electrostatically attractable into its deflected position.

In the improved DMD, a deposit of an inorganic passivant resides on one or both of the engageable portions of the stationary member and the mirror element. The passivant is SiC, AlN or $SiO_2$ and preferably has a thickness between about 0.6 nm and about 5 nm thick. The passivant may be deposited by RF magnetron sputtering or other convenient method. The deposit functions as an anti-stick passivant even though its surface energy is higher than that of perfluorochemicals, such as PFDA and Teflon, which are used as similar passivants. Indeed, over time, the passivants of the present invention have been observed to function better as anti-stick passivants than many perfluorochemical passivants. The deposited passivants of the present invention are mechanically strong, scratch resistant, and thermally and chemically stable.

DETAILED DESCRIPTION

Figure 1:
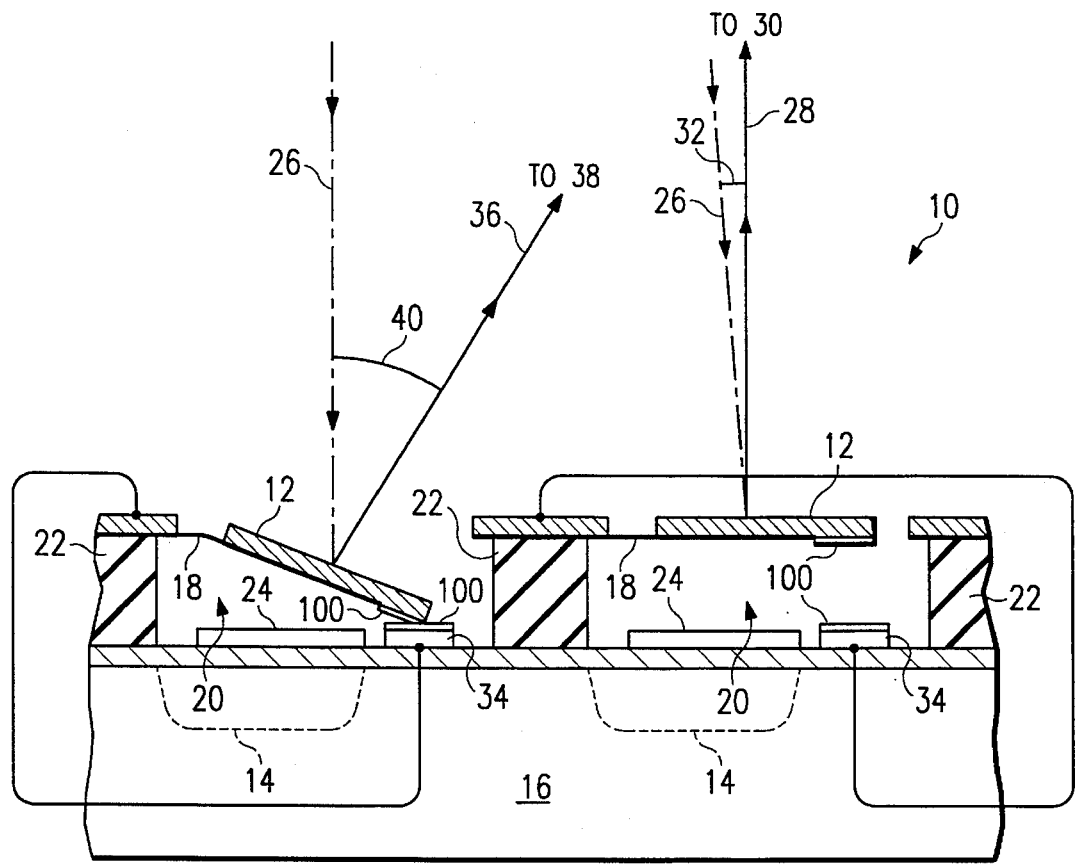
FIG. 1 is a generalized, sectioned side view of a portion of a DMD device.

Referring first to FIG. 1, there are shown two adjacent, individual DMD's 10, which may be of the type shown in commonly assigned U.S. Pat. No. 5,061,049 to Hornbeck and U.S. Pat. No. 3,600,798 to Lee. The DMD's 10 may also be similar to those shown in U.S. Pat. No. 4,356,730 to Cade, U.S. Pat. No. 4,229,732 to Hartstein et al, U.S. Pat. No. 3,896,338 to Nathanson et al, and U.S. Pat. No. 3,886,310 to Guldberg et al. The above types of DMD's 10 may be used in systems such as those shown in commonly assigned U.S. Pat. No. 5,101,236 to Nelson et al, 5,079,544 to DeMond et al, U.S. Pat. No. 5,041,851 to Nelson, and U.S. Pat. No. 4,728,185 to Thomas. In the following Description, the DMD's 10 are described as operating in a bistable or digital mode, although they may be operated in other modes, such as tristable or analog.

As generally depicted in FIG. 1, each DMD 10 includes a relatively thick and massive, metal or metallic light-reflective, movable or deflectable mirror element 12 and associated addressing circuits 14 for selectively deflecting the mirror elements 12. Methods of monolithically forming the mirror elements 12 and the addressing circuits 14 in and on a common substrate 16 are set forth in the above-noted patents. Typically, each mirror element 12 deflects by moving or rotating up and down on one or more relatively thin, integral supporting beams or hinges 18. Although FIG. 1 illustrates a single cantilever beam 18, the mirror element 12 may be supported by one or more torsion beams or flexure beams, as discussed earlier.

Undercut wells 20 are defined between columnar members 22, which may comprise residual photoresist remaining on the substrate 16 after functioning as a portion of a etching, deposition, and/or implantation mask during the formation of the DMD 10. Each beam 18 is supported by one member 22. Each well 20 accommodates the deflection of its associated mirror element 12 by permitting it to move toward the substrate 16, as shown at the left in FIG. 1, from an undeflected position, shown to the right in FIG. 1. Deflection of each mirror element 12 is effected by the attractive electrostatic force exerted thereon by an electric field resulting from a potential applied to an associated control electrode 24 in its well 20 and on the substrate 16. The potential is selectively applied to the control electrode 24 by its addressing circuit 14.

When a beam 18 is undeformed, it sets the normal position of its mirror element 12, as shown at the right in FIG. 1. Light along a path 26 which is incident on the device 10 when a mirror element 12 is in its normal position is reflected thereby along a path, denoted at 28, to a first site, generally indicated at 30. An angle 32 is defined between the paths 28 and 30.

When an addressing circuit 14 applies an appropriate potential to its control electrode 24, its mirror element 12 is electrostatically attracted out of its normal position toward the control electrode 24 and the substrate 16. The mirror element 12 accordingly moves or deflects until it engages a landing electrode 34, as shown at the left in FIG. 1, and resides in its deflected position. The use of the landing electrode 34 is recommended by the aforenoted '279 patent. Specifically, the landing electrode 34 serves as a mechanical stop for the mirror element 12, thus setting the deflected position thereof. Further, the engagement of the landing electrode 34 and the mirror element 12 prevents the mirror element 12 from engaging the control electrode 24. Because of the potential difference between the mirror element 12 and the control electrode 24, such engagement would result in current flow through the mirror element 12. Current flow of this type is likely to weld the mirror element 12 to the control electrode 24 and/or to fuse or melt the relatively thin beam 18.

In the deflected position of the mirror element 12, the incident light on the path 26 is reflected along a path 36 to a second site 38. An angle 40 is defined between the paths 26 and 36. In the present example, the angle 32 is smaller than the angle 40.

The first site 30 may be occupied by a utilization device, such as a viewing screen or a photosensitive drum of a xerographic printing apparatus. The light 36 directed to the second site 38 may be absorbed or otherwise prevented from reaching the first site 30. The roles of the sites 30 and 38 may, of course, be reversed. In the foregoing way, the incident light 26 is modulated by the DMD's 10 so that it selectively either reaches or does not reach whichever site 30 or 38 contains the utilization device.

Figure 2:
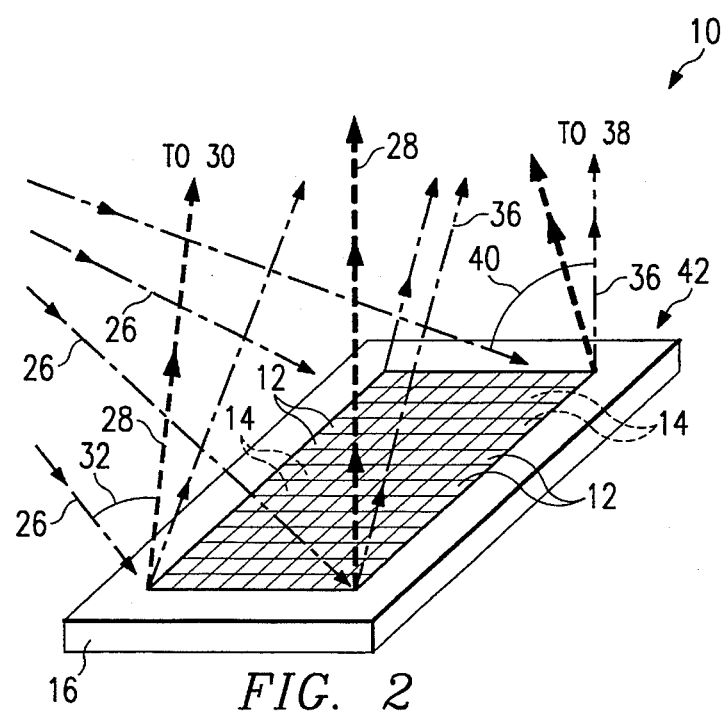
FIG. 2 is a generalized perspective view of an area array of DMD's of the type depicted in FIG. 1.
Figure 3:
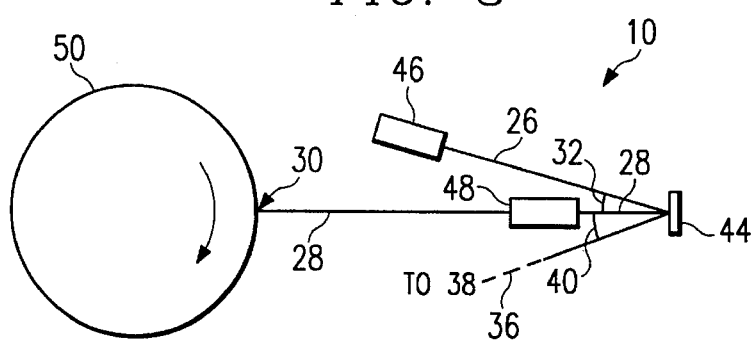
FIG. 3 schematically illustrates a printing system utilizing a linear array of DMD's of the type depicted in FIG. 1.

FIG. 2 generally depicts an area array 42 of the DMD's 10 shown in FIG. 1. FIG. 3 depicts a linear array 44 of the DMD's 10 shown in Figure 1. In FIG. 3, the incident light 26 is emitted from a suitable source 46 and is reflected along either the path 28 or the path 36. The path 28 directs the reflected light through a lens 48 to the surface of a photosensitive drum 50 of a xerographic printing apparatus (not shown). The reflected light traversing the path 36 does not reach the drum 50 and may be directed onto a "light sink" whereat it is absorbed or otherwise prevented from reaching the drum 50 or otherwise affecting the light traversing the paths 26 and 28.

When the mirror element 12 is in its deflected position and engages its landing electrode 34, its beam 18 is deformed and, accordingly, stores energy therein which tends to return the mirror element 12 to its normal position. The return of the mirror element 12 to its normal position is often aided or achieved by the application of a reset voltage or signal between the mirror element 12 and the control electrode 24.

In theory, when the control electrode 24 is de-energized by the addressing circuit 14, the stored energy will return the mirror element 12 to the normal position. As discussed in commonly assigned U.S. Pat. No. 5,096,279, the stored energy alone may be insufficient to return the mirror 12 to the normal position. For example, either or both portions of the mirror element 12 and the landing electrode 34 which are engaged during deflection of the former may become intermetallically welded or otherwise stick or adhere due to their possessing high surface energy. Such high surface energy may result from the inherent material characteristics of the mirror 12 and the electrode 24 or from substances or contaminants deposited or sorbed onto the engaged portions. Simple de-energization of the control electrode 24 may, accordingly, not result in the mirror element 12 returning to its normal position if the mirror element 12 and the landing electrode 28 stick or adhere. The '279 patent describes a technique for applying special reset signals to the control electrode 28 which overcome the sticking or adhering together of the mirror element 12 and the landing electrode 34.

The present invention relates to a technique for passivating a DMD by depositing an inorganic passivant, such as a low surface energy inorganic coating or solid lubricant on one or both of the engageable portions of the mirror element 12 and the landing electrode 34. The inorganic passivant discourages the aforenoted sticking or adherence problem, while exhibiting higher scratch resistance, mechanical strength, and chemical and thermal stability than organic passivants of the type discussed earlier.

It has been found that notwithstanding the implementation of techniques of the type disclosed in the '279 patent, mirror elements 12 and landing electrodes 34 of DMD's 10 stick or adhere together, especially after an extended period of use. It is postulated that the low surface energies of the deposited organic materials degrade over time or that low surface energy of a deposited passivant is not the only determinant of adherence-prevention. This latter postulate follows from the fact that deposits of the passivants of the present invention have higher surface energies than deposits of many organic DMD passivants, yet result in better DMD operation over time.

As discussed more fully below, prior DMDs passivated with various materials, such as the organic materials discussed above, have initially properly operated, but have exhibited degraded operation after the passage of time. Such degraded operation is characterized by an increasing number of mirror elements which will not reset when a previously used reset voltage is used—a higher reset voltage being required. Stated differently, over time, in order to reset all of a maximal number of the reflectors, the absolute value of the reset voltage or signal must be increased. Increasing or high sticking of the mirrors 12 to their landing electrodes 34 is, therefore, characterized by increasing or high absolute values of reset signals or voltages. It is desirable to be able to utilize reset voltages which have reasonable magnitudes and, if reset voltages do not remain constantly low from the onset of operation of the DMD, for such reset voltages to stabilize over time at reasonably low values. The present invention is intended to prevent sticking and/or to limit the force of such sticking so that the mirrors 12 can be reliably returned to their normal positions during operation of the DMDs 10.

According to the present invention, chemically and mechanically stable inorganic passivant or solid lubricant coatings 100 such as SiC, AlN or $SiO_2$ are deposited on the engageable portions of the mirror elements 12 and the related landing electrodes 34. Such deposition is preferably achieved by RF magnetron sputtering. These passivant coatings 100 prevent or limit to reasonable values sticking or adherence of the mirror elements 12 and their landing electrodes 34, and, for reasons not fully understood—but which are possibly related to the coatings 100 preventing metal-metal bonds or metal-fluorine-metal bonds and/or to the high mechanical strength and thermal and chemical stability of the passivants 100—they appear to offer surface reasonably long lived passivation. Interestingly, the surface energy of the passivants 100 of the present invention is somewhat higher than the surface energies of organic passivants such as PFDA, PFDE and Teflon.

Figure 4:
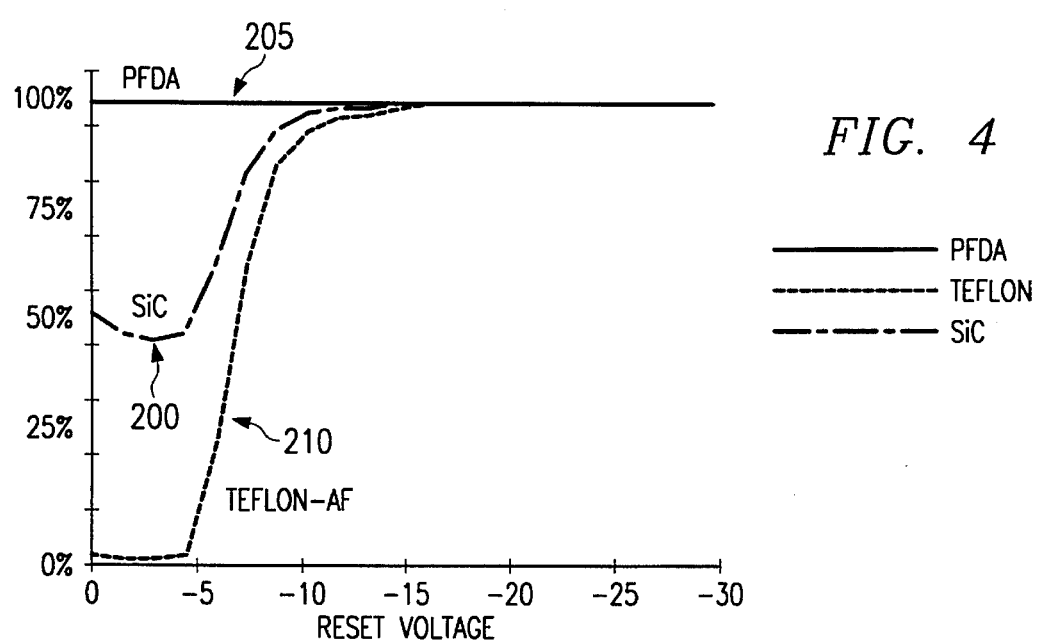
FIGS. 4–9 are graphical illustrations representing the improved operation of the DMDs of FIGS. 1–3 which have been passivated according to the present invention in comparison to other techniques.

SiC films 100 were deposited on DMDs, including the engageable portions of the mirror elements 12 and landing electrodes 34 by RF magnetron sputtering at room temperature. The thickness of the sputtered films was measured nominally at 1.7 nm, but thicknesses ranging from about 0.5 nm to about 5.0 nm give beneficial results. Referring to FIG. 4, the operation of a DMD 10 immediately following passivation with SiC is represented by the curve 200. The curve 200 is depicted on a graph in which the abscissa represents reset voltage and the ordinate represents the percentage of properly operating DMD's in an array thereof, with 100% representing all of the DMDs 10 in the array. Curve 200 of FIG. 4 illustrates that at the onset of operation of SiC-passivated DMDs 10, slightly more than half will reset without the application of a reset voltage and that with increasing absolute magnitude of reset voltage 100% of the DMDs 10 reset when the reset voltage is about −15 volts. As shown by curve 205, all DMDs 10 in an array passivated with PFDA appear to reset without a reset voltage at the onset of operation. As shown by curve 210, practically none of the DMDs 10 passivated with Teflon-AF reset without the application of a reset voltage, but 100% thereof reset when the reset voltage reaches about −16.5 volts. Thus, for reset voltages up to a value of about −15 volts and at the onset of operation, SiC (curve 200) is a better passivant than Teflon-AF curve 210) and a worse passivant than PFDA (curve 205), even though the surface energy of the SiC deposit 100 is higher than that of either of the organic materials.

Figure 5:
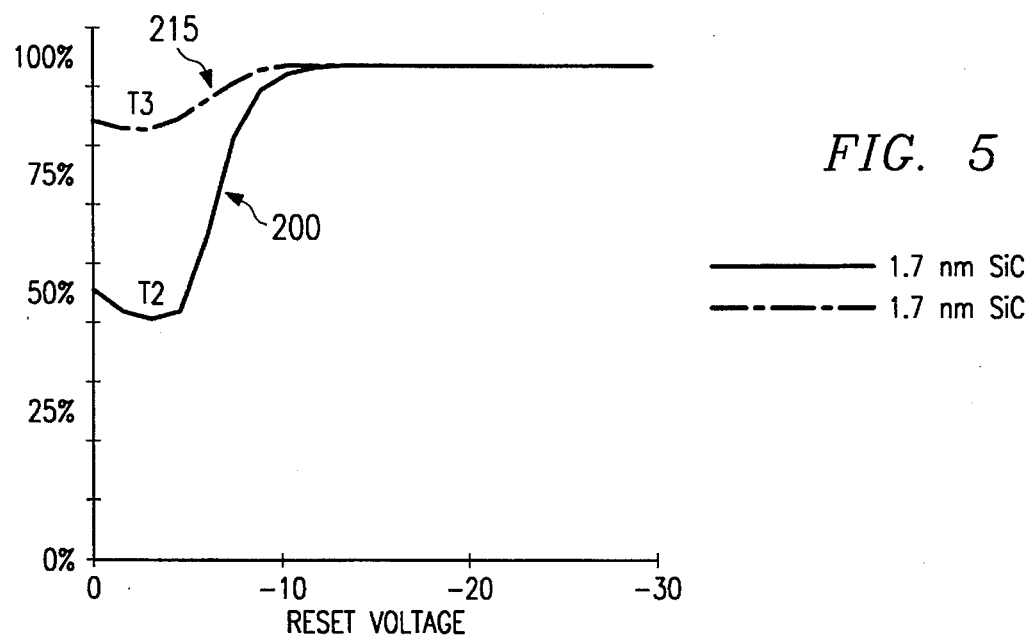

FIG. 5 is similar to FIG. 4. It depicts the curve 200 and a curve 215 representing reset voltage versus percent of DMDs reset after the DMD array has been continuously operated for 20 hours. About 83% of the DMDs 10 now reset without a reset voltage and 100% resetting is achieved with a lower reset voltage of −12 volts.

Figure 6:
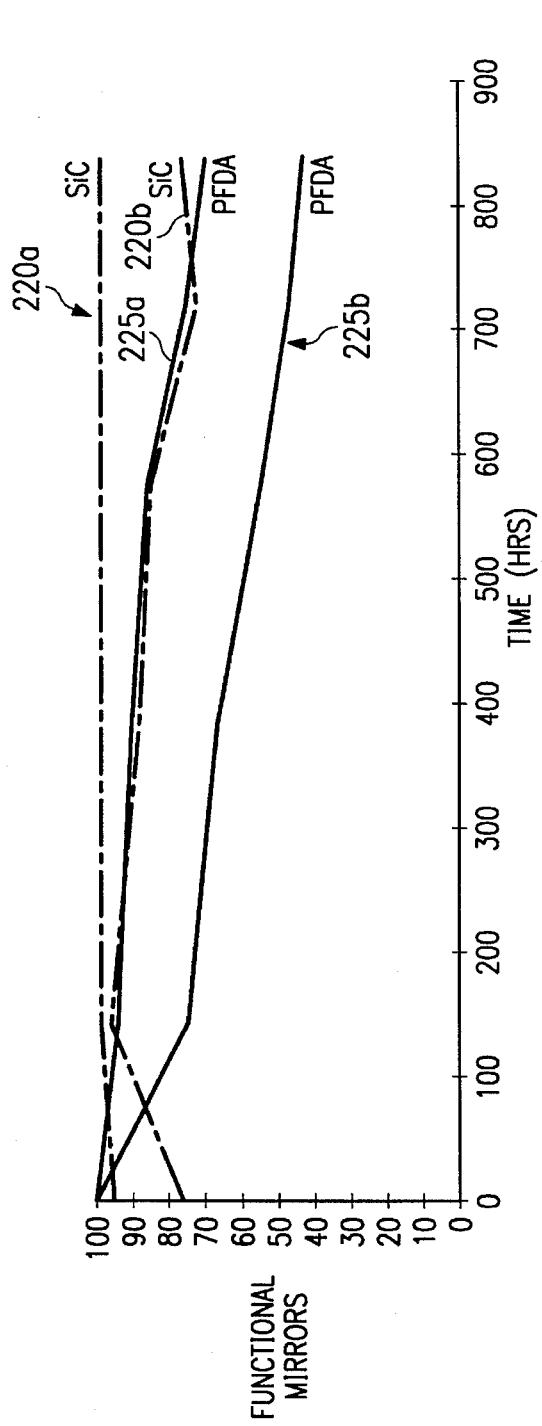

FIG. 6 is a graph in which the abscissa is operating time in hours and the ordinate is the percentage of DMDs 10 which properly operate, that is, which reset after moving out of the normal position. Curves 220a and 220b represent the operation of two arrays of DMDs 10 passivated with SiC 100, while curves 225a and 225b represent the operation of two arrays of DMDs 10 passivated with PFDA, which at the onset of operation appeared to be a better passivant than SiC 100. FIG. 6 shows that following about 150 hours of operation, an equal or greater percentage of SiC-passivated DMDs (220a and 220b) properly operate than DMDs passivated with PFDA (225a and 225b).

Figure 7:
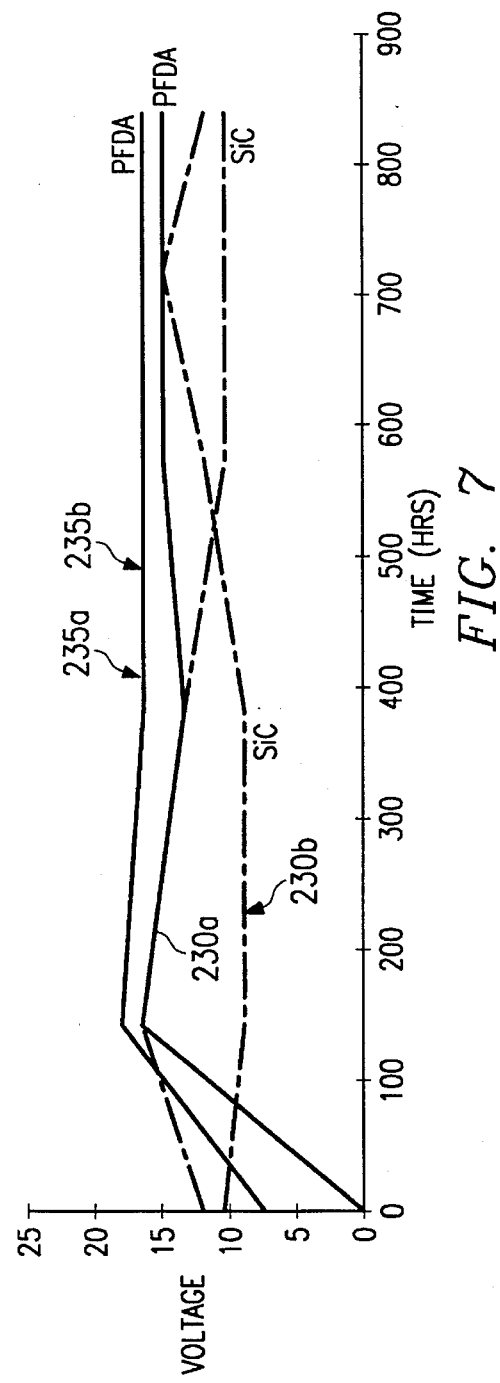

FIG. 7 illustrates that after 150 hours of continuous operation, the reset voltages required to reset 100% of SiC-passivated DMDs (230a and 230b) is lower than the reset voltage required to reset PFDA-passivated DMDs (235a and 235b). This relative comparison obtains for operating periods of at least nearly 850 hours.

Figure 8:
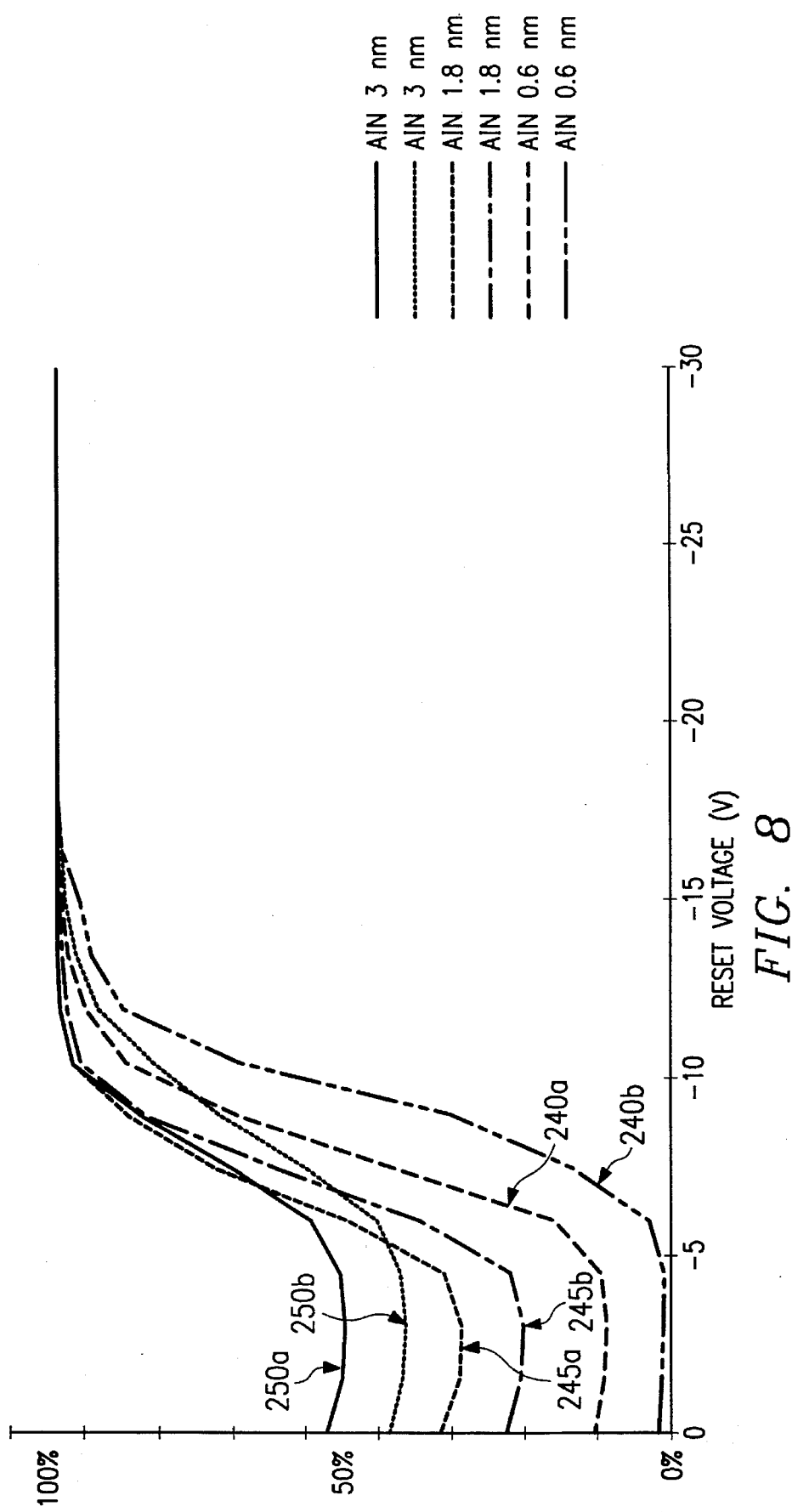
Figure 9:
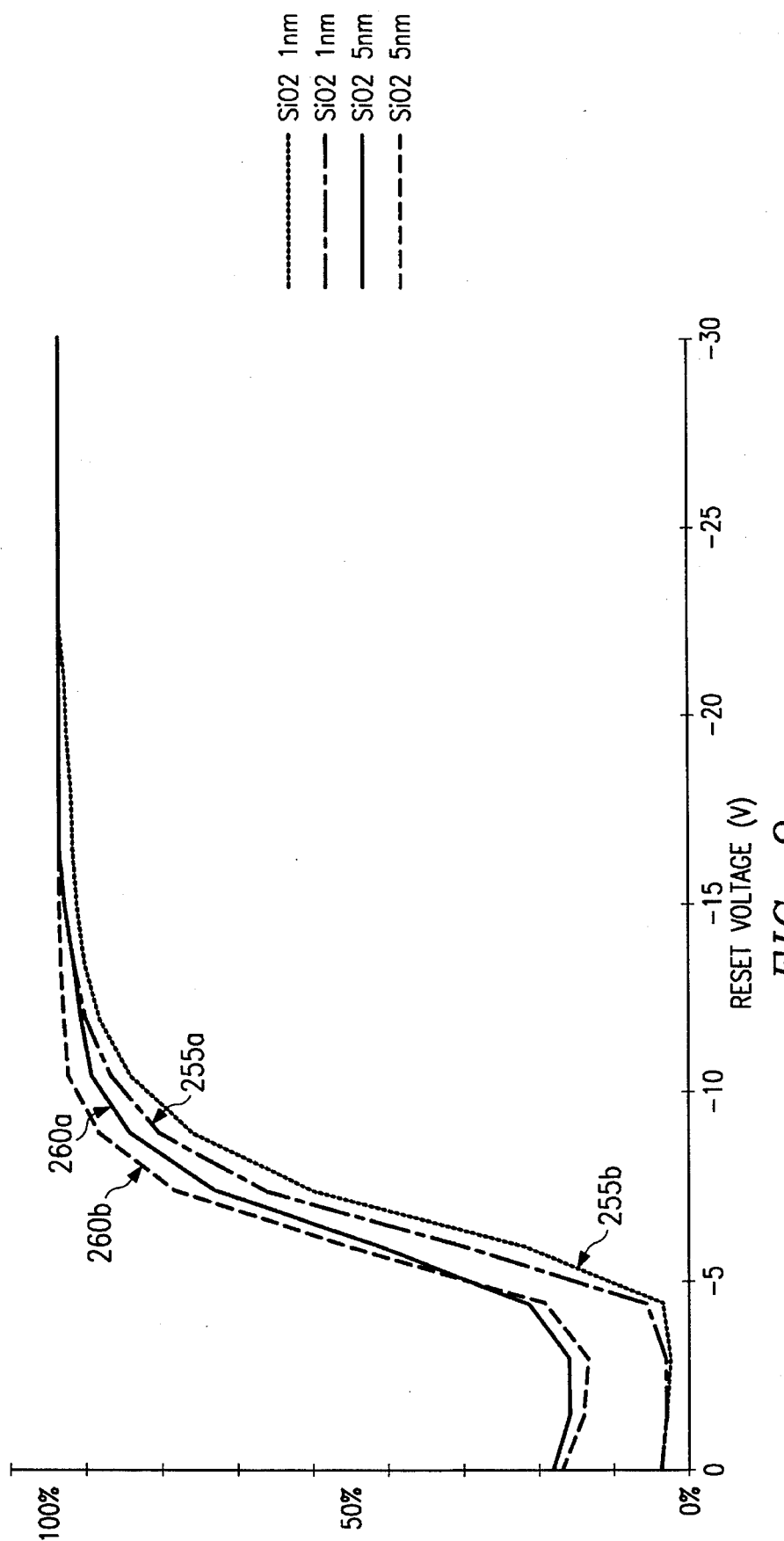

FIG. 8 is similar to FIG. 4, but the curves represent the operation of DMDs passivated with AlN. Curves 240a and 240b represent the reset voltages necessary to reset varying percentages of DMDs 10 passivated with 0.6 nm of AlN. Curves 245a, 245b and 250a, 250b represent the reset voltages necessary to reset varying percentages of DMDs passivated with 1.8 nm and 3 nm, respectively, of AlN. 100% of the DMDs are reset at voltages between about −11 volts and −17.5 volts. FIG. 9 is similar to FIG. 8 and represents the operation of DMDs 10 passivated with $SiO_2$ at thicknesses of 1 nm (curves 255a and 255b) and 5nm (curves 260a and 260b). AlN functions as an anti-stick passivant at thicknesses of about 0.6 nm to about 7.5 nm; so, too, does $SiO_2$ at thicknesses of about 0.5 nm to about 20 nm.

Thus, the reliability of DMDs 10 which are operated for extended times after being passivated with SiC, AlN or $SiO_2$ equals or surpasses that of DMDs 10 which are not passivated or which are passivated with certain organic materials such as polyfluorochemicals. Additionally, when the inorganic passivants 100 are deposited on the beams 18 and mirror elements 12 of the DMD 10, the mechanical strength of these elements may be increased. This same relatively higher mechanical strength, and the higher scratch resistance and mechanical strength of the inorganic passivants of the present invention, along with their higher thermal and chemical stability, recommends the passivating materials of the present invention.

Those skilled in the art will appreciate that the foregoing description sets forth only preferred embodiments of the present invention and that various modifications and additions may be made thereto without departing from the spirit and scope of the present invention.

What is claimed is:

1. A micromechanical device of the type which includes a movable element having a normal position set by a deformable beam in its undeformed state and a deflected position in which the beam is deformed and a portion of the element engages a portion of a stationary member, deformation of the beam storing therein energy which tends to return the element to the normal position, the element being selectively electrostatically movable into its deflected position; the device comprising:

a deposit of an inorganic passivant on the stationary member at the portion that the element engages the stationary member, wherein the deposit is between about 0.5 nm and about 20 nm thick.

2. A device as in claim 1 wherein said passivant is mechanically strong, scratch resistant, and thermally and chemically stable.

3. A method of passivating a micromechanical device of the type which includes a movable element having a normal position set by a deformable beam in its undeformed state and a deflected position in which the beam is deformed and a portion of the element engages a portion of a stationary member, deformation of the beam storing therein energy which tends to return the element to the normal position, the element being selectively electrostatically attractable into its deflected position; the method comprising:

depositing a sufficient thickness of an inorganic, mechanically strong, scratch-resistant, and thermally and chemically stable passivant on one or both of the engageable portions of the stationary member and the element to prevent or limit sticking of the element to the stationary member, wherein the thickness is between about 0.5 nm and about 20 nm.

4. A method as set forth in claim 3, wherein:

the passivant is SiC, AlN or $SiC_2$.

5. A method as set forth in claim 3, wherein:

deposition of the passivant is effected by RF magnetron sputtering.

6. A method as set forth in claim 3, wherein the element is fabricated of a light reflecting material.

7. A micromechanical device of the type which includes a movable element having a normal position set by a deformable beam in its undeformed state and a deflected position in which the beam is deformed and a portion of the element engages a portion of a stationary member, deformation of the beam storing therein energy which tends to return the element to the normal position, the element being selectively electrostatically movable into its deflected position; the device comprising:

a deposit of an inorganic passivant on one or both of the engageable portions of the stationary member and the element, the passivant being SiC, AlN or $SiO_2$, wherein the deposit is between about 0.5 nm and about 20 nm thick.

8. A device as set forth in claim 7, wherein:

the passivant is deposited by RF magnetron sputtering.

9. A device as set forth in claim 7, wherein:

the passivant is SiC having a thickness of about 0.5 nm to about 5 nm.

10. A device as set forth in claim 7, wherein:

the passivant is AlN having a thickness of about 0.6 nm to about 7.5 nm.

11. A device as set forth in claim 7, wherein:

the passivant is $SiO_2$ having a thickness of about 0.5 nm to about 20 nm.

12. A device as set forth in claim 7, wherein:

the deposit also resides on the beam.

13. A device as set forth in claim 7, wherein:

the element is a mirror element and the device functions as a spatial light modulator.

14. A spatial light modulator of the type which includes a movable mirror element having a normal position set by a deformable beam in its undeformed state and a deflected position in which the beam is deformed and a portion of the mirror element engages a portion of a stationary member, deformation of the beam storing therein energy which tends to return the mirror element to the normal position, the mirror element being selectively electrostatically attractable into its deflected position; the DMD comprising:

a deposit of an inorganic, mechanically strong, scratch resistant, and thermally and chemically stable passivant on one or both of the engageable portions of the stationary member and the mirror element, wherein the passivant is SiC, AlN or $SiO_2$, wherein the deposit is between about 0.5 nm and about 20 nm thick.

15. A spatial light modulator as set forth in claim 14 wherein:

the passivant is deposited by RF magnetron sputtering.

16. A DMD as set forth in claim 14, wherein:

the deposit also resides on the beam.

* * * * *